United States Patent [19]
Fuderer

[11] Patent Number: 5,958,109
[45] Date of Patent: Sep. 28, 1999

[54] ADSORPTION PROCESS FOR RECOVERY OF SOLVENTS

[76] Inventor: Andrija Fuderer, Wielewaalstrasse 22 B 2610, Antwerpen, Belgium

[21] Appl. No.: 09/079,940

[22] Filed: May 15, 1998

[51] Int. Cl.[6] .................................................. B01D 53/04
[52] U.S. Cl. .................................. 95/99; 95/106; 95/143
[58] Field of Search .................................. 95/97, 99, 104, 95/106, 143–147

[56] References Cited

U.S. PATENT DOCUMENTS

| | | | |
|---|---|---|---|
| 2,799,362 | 7/1957 | Miller | 95/143 X |
| 2,799,364 | 7/1957 | Miller | 95/143 X |
| 2,823,764 | 2/1958 | Miller | 95/143 X |
| 3,006,438 | 10/1961 | De Yarmett | 95/143 X |
| 3,080,692 | 3/1963 | Staley et al. | 95/143 X |
| 3,121,002 | 2/1964 | Kilgore et al. | 95/143 X |
| 3,124,438 | 3/1964 | Lavery | 95/143 X |
| 3,378,992 | 4/1968 | Pierce et al. | 95/143 |
| 3,713,272 | 1/1973 | Barrere, Jr. et al. | 95/143 X |
| 4,421,532 | 12/1983 | Sacchetti et al. | 95/104 |
| 5,389,125 | 2/1995 | Thayer et al. | 95/143 X |
| 5,542,965 | 8/1996 | Straubinger et al. | 95/143 X |
| 5,695,546 | 12/1997 | Izumi et al. | 95/143 X |
| 5,702,505 | 12/1997 | Izumi et al. | 95/143 X |
| 5,759,236 | 6/1998 | Brück et al. | 95/143 X |
| 5,779,768 | 7/1998 | Anand et al. | 95/99 |

*Primary Examiner*—Robert Spitzer
*Attorney, Agent, or Firm*—Michael J. Striker

[57] ABSTRACT

Organic solvents are removed from air by adsorption on fixed beds of activated carbon. Each carbon bed is periodically regenerated by heating it in two distinct steps and then by cooling it in two steps with a circulated inert gas stream. During the first step of heating a portion of the water is removed from the inert gas by molecular sieves or preferably by chilling the inert gas to below 10° C. In a second step of heating the essentially water-free liquid solvent is recovered by chilling the inert gas. The first step of cooling of a bed is overlapping with the first step of heating of another bed. The hot gas leaving the cooled bed is used to heat the other bed. Between the two stages of heating the bed is put on "hold" till the final cooling step of another bed is completed.

6 Claims, 1 Drawing Sheet

ADSORPTION PROCESS FOR RECOVERY OF SOLVENTS

BACKGROUND OF THE INVENTION

The present invention relates to an adsorption process for recovery of solvents.

In the painting and printing industries the paint or ink is dried by evaporating the solvent with hot air. The solvent laden air contains typically 2–12 grams of solvent in a standard cubic meter (g/scm) and 6–24 g/scm water vapor. This air is passed through activated carbon. Most of the solvent and some of the water is adsorbed on this carbon and the purified air is vented or reused for paint drying. The adsorption can be carried out with a moving bed or fixed beds of activated carbon. Horizontal, vertical or radial fixed beds may be utilized as well. The solvent adsorbed on the activated carbon can be desorbed by heating and stripping either with steam or a hot inert gas with a low oxygen content.

A disadvantage of the desorption with steam is, that the recovered solvents contain large amounts of water which form azeotropic mixtures with many solvents.

When the desorption is carried out with hot inert gas, the solvent is recovered by chilling the circulating inert gas. Water is also being desorbed during the heating and stripping with hot gas and the condensate recovered by chilling contains 4–10 wt % of water. If molecular sieves are used to remove the water from the gas before its chilling, a solvent with less than 0.3 wt % water can be recovered. The regeneration of the activated carbon bed is completed by cooling the hot bed with cold gas, preferably to below 90° C., to exclude the ignition of solvent or carbon when air is again passed to the bed. The regeneration thus includes a heating and a cooling step. In adsorption processes for solvent recovery with inert gas regeneration both the heating and the cooling of the beds is carried out in closed loops: The gas leaving one end of the bed is cooled and/or heated in suitable exchangers to be returned to the other end of the same bed. A blower is provided for the gas circulation.

The disadvantages of this process are the additional cost of the molecular sieves beds, the associated switching valves and other equipment, such as necessary to regenerate the molecular sieves. Another more important disadvantage is that during the cooling of the bed a substantial amount of solvent from the circulating inert gas leaving one end of the bed cannot be removed by chilling. Typically the gas leaving the chiller at around –10° C. still contains 30–100 g/scm solvent. This solvent is readsorbed on the other end of the bed, thereby significantly reducing the available adsorptive capacity of the bed. Because of the lower adsorptive capacity the time of adsorption must be shortened and consequently the time of regeneration as well. To complete the regeneration (heating and cooling) in a shorter time, a larger flowrate of inert gas must be applied, which requires more heating, more refrigeration for chilling the gas and a larger blower: in general more fuel and electric power and more expensive equipment. In the process using fixed beds, several fixed beds are installed and while one or several beds are cyclically in the phase of adsorption one bed is being regenerated. Adsorptive separations using heating for desorbtion are called thermal swing processes.

A way to reduce the amount of required heat is to begin the cooling step before the entire bed reaches the maximum temperature. The cold gas is taking up heat at the inlet end of the bed and depositing it further ahead, pushing the hot front toward the outlet of the bed. This last method called "thermal pulse" is used with preference in the field of solvent recovery. Its advantage is, that at any time, only one bed is in regeneration. However this method does not efficiently solve the problems of the solvent reloading into the bed and the drying of the gas.

Another way to save heat is the following: When a hot adsorbent bed is cooled, the gas exiting from the bed is warm. It can be further heated and used to heat another bed. In this way the heat contained in one bed is partly recovered to heat another bed. This possibility is sometimes used in the field of drying of natural gas or other gases.

SUMMARY OF THE INVENTION

Accordingly, it is an object of present invention to provide an adsorption process for recovery of solvents, which avoids the disadvantages of the prior art.

In keeping with these objects and with others which will become apparent hereinafter, one feature of present invention resides, briefly stated, in an improved thermal swing adsorption process for solvent recovery applying at least three adsorbers with fixed beds of activated carbon in which each bed is in overlapping cycles periodically subjected to a sequence of at least the following steps:

a) Solvent containing air is passed to the bed where the solvent is adsorbed;

b) The bed is heated in a first heating step with a hot gas coming from another bed which is being cooled;

c) The bed is put on "hold" or "idle", (while still another bed completes step g);

d) The bed is further heated in a second heating step by hot gas in an essentially closed loop;

f) The bed is cooled in a first cooling step during which the gas exiting from the cooled bed is passed to another bed starting its heating as described in step b);

g) The bed is cooled in a second, final cooling step in an essentially closed loop.

When the adsorption process for recovery of solvents is performed in accordance with the present invention, it avoids the disadvantages of the prior art and provides for the highly advantageous results.

The novel features which are considered as characteristic for the present invention are set forth in particular in the appended claims.

DESCRIPTION OF PREFERRED EMBODIMENTS

Figure 1:
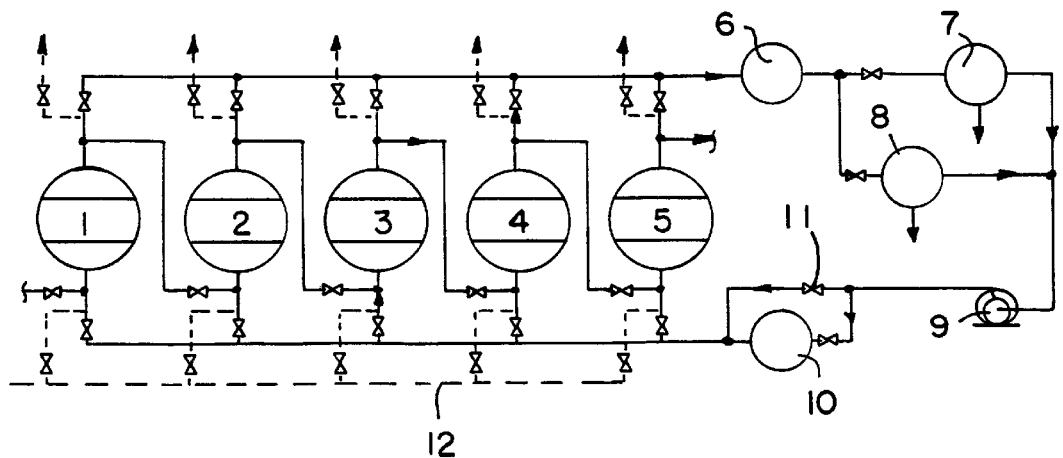
FIG. 1 is a flowsheet of an example of the process according to the invention with five beds.

An adsorption process for recovery of solvents in accordance with the present invention is carried out in the following manner.

The regeneration of the activated carbon bed includes heating and then cooling. However, the heating as well as the cooling is done in two distinct steps or stages. The first heating of the bed is done with a gas coming directly from another bed, which is being cooled. The inert gas passes the following loop:

blower-cooled bed-heated bed-gas cooler and chiller for removal of water-blower. It is important to know how the solvent and the water are transported from one bed to another. For example one bed is cooled with a gas coming from the molecular sieves bed or preferably from the water removal chiller. The gas is entering to the cooled bed typically with a temperature between −20 and 30° C., and contains between 1 and 5 g/scm solvent and only 2–10 g/scm water. The bed is hot, and does not contain almost any water, since all water was desorbed during the heating period. As the bed is cooled, most of the water is adsorbed in it. The gas at the outlet of the bed is for example at 140° C., it contains very little water vapor, but much solvent, typically between 120 and 20 g/scm. The cooling of this bed is very efficient, because in addition to the effect of cold gas, there is a strong cooling effect due to large amounts of solvent desorbed. The hot gas effluent gas from the cooled bed is passed to the other bed starting the heating step. In this bed, the heating is very efficient because in addition to the fairly high inlet temperature, there is the effect of adsorption of a substantial amount of solvent. Helped by the very low water concentration in the inlet gas and the effect of heating, the water is being desorbed from this heated bed more rapidly and completely.

Computer simulations and measurements of the solvent and water content of the gas exiting from the heated bed have shown that initially very little solvent but much water is present in the gas till the exit temperature reaches some 65–85° C. At this point of time the solvent concentration very rapidly increases while the water concentration rapidly drops, since some 95% of the water, but less than 1% of solvent, contained originally in the bed is already desorbed.

Molecular sieves may be used to remove the water from the gas. However it was found, that specifically in this cycle it is sufficient to remove the water by chilling. There is a refrigeration unit for the solvent recovery anyway. Instead of one chiller cooled with brine or evaporating refrigerant, two chillers are provided: in the first period of time the gas is directed to the chiller serving for water condensation or freezing, and when most of the water is removed from the bed and the gas rich in solvent arrives, the gas is directed by suitable valves to the other chiller for solvent condensation and recovery. The periodical switching from one chiller to the other is less costly then the drying system using molecular sieve beds and it requires much less energy. It was found that the cooled bed is not capable to adsorb all the water which is being desorbed from the heated bed. For this reason a portion of water has to be removed with other means, for example by chilling the gas.

Thus putting a part of time two carbon beds simultaneously in the inert gas regeneration loop, such that one bed is cooled, and the other bed is heated, has in the solvent recovery process multiple advantages:

The heat contained in the gas exiting from the hot bed is reutilized. This particular advantage was well known in other applications;

Due to the water removal from one bed and water adsorption in the other bed the excess water can be eliminated by simple chilling instead of expensive and energy consuming drying by molecular sieves and their regeneration, and most important;

the bed is cooled with a gas containing very little solvent: very little solvent is reloaded to the cooled bed and the free adsorbing capacity of the carbon remains high which results in longer cycles and a further reduction of inert gas flowrate and hence in further reduction of energy requirement.

due to the transport of solvent from the cooled to the heated bed, both the cooling and the heating are more rapid and efficient.

Surprisingly, it was found that it is better to interrupt this beneficial period before the cooling of the bed is completed. When during the first heating of a bed the front of the solvent breaks through and a high concentration of solvent appears in the gas, it is advantageous to discontinue the heating of the bed, and leave this bed in a "hold" position i.e. inactive, while the cooling of the other bed is completed in closed loop. The significant advantage is, that the concentration of solvent in the gas exiting from the partially cooled bed is already very low, typically between 10 and 0.1 g/scm, so that the entire cooling step is done with a gas containing only little solvent. The result is a carbon bed regenerated extremely well, with an exceptionally high adsorbing capacity. This in turn means that the cycle time of both adsorption and regeneration can be longer. The final result is that the overall gas needed to desorb 1 kg solvent is reduced by 30–35%. Compared to conventional processes this means significant saving of equipment size and energy. Including the advantage of elimination of the molecular sieves and the heat needed for their regeneration, the specific heat requirements expressed in kWh or Joules/g of solvent is reduced by around 55%.

The "closed loop" of inert gas is not rigorously closed: some solvent or water may be removed from the loop by chilling, some nitrogen or inert gas may be added during the cooling period or removed from the loop during heating to maintain the same pressure. However, these quantities are small compared to the flow of circulating inert gas, thus the loop can be considered as essentially closed.

In accordance with the present invention, in the improved thermal swing adsorption process for solvent recovery at least three adsorbers are applied with fixed beds of activated carbon in which each bed is in overlapping cycles periodically subjected to a sequence comprising at least the following steps:

a) solvent containing air is passed to the bed where the solvent is adsorbed;

b) the bed is heated in a first heating step with a hot gas coming from another bed which is being cooled;

c) the bed is put on "hold" or "inactive", (while the other bed completes step g);

d) the bed is further heated in a second heating step by hot gas in an essentially closed loop;

f) the bed is cooled in a first cooling step during which the gas exiting from the cooled bed is passed to another bed starting its heating as described in step b);

g) the bed is cooled in a second final cooling step in an essentially closed loop;

In some cases it may be advantageous to add between steps d) and f) another cooling step e) in which for a short time the cooling of the bed is started in the same closed loop as under step d) but with the heater inactive or bypassed. The bed somewhat precooled in this way will more efficiently adsorb and retain the water left in the gas after chilling.

The inventive adsorption process for recovery of solvents is illustrated by several examples.

EXAMPLE 1

There are 5 beds. NB=5. The duration of the single steps b) to g) in minutes is: b=30, c=15, d=60, e=0, f=30 and g=15 minutes. It will be noted that b=f and c=g, because steps b and c of one adsorber overlap with steps f and g of another adsorber. The sum of these steps is the regeneration time REG=b+c+d+e+f+g.

The sum of steps b+c+d+e=SUB represent a "subcycle". The duration of a complete cycle is CYCLE=NB*SUB.

In the above example REG=150, SUB=105, CYCLE=525 minutes and the duration of the adsorption step is a=525−150=375 minutes. In the time average there are 3.57 beds simultaneously on adsorption but actually there are either 3 or 4 beds on adsorption.

The flowsheet of the exemplary process with 5 beds is illustrated on FIG. 1.

The numbers on the flowsheet represent: 1 to 5=adsorbent beds, 6—gas cooler, 7—chiller for solvent recovery, 8—chiller for partial water removal, 9—blower and 10—gas heater, 11—heater bypass valve, 12—main air line. The regeneration gas piping is shown with full lines, the air piping is indicated with dotted lines.

Cooler 6 is preferably cooled with cooling water, chillers 7 and 8 with brine or evaporating refrigerant and heater 10 is preferably heated with circulating hot oil.

Figure 2:
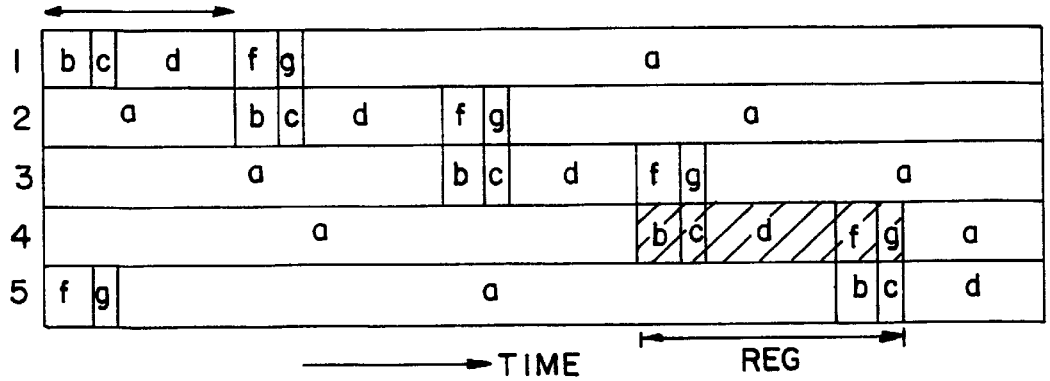
FIG. 2 is a cycle chart showing the various steps occurring in the five beds of the exemplary process of FIG. 1 and their relative durations.

With reference to the flowsheet and cycle chart of FIGS. 1 and 2 respectively, the steps of regeneration of bed 4 are summarized in the following table:

| Step of bed 4 | Gas route |
| --- | --- |
| b) first heating | Blower 9 - Bypass 11 - Bed 3 - Bed 4 - Cooler 6 - Chiller 7 |
| c) idle = "hold" | Blower 9 - Bypass 11 - Bed 3 - Cooler 6 - Chiller 7 |
| d) 2nd heating | Blower 9 - Heater 10 - Bed 4 - Cooler 6 - Chiller 8 |
| f) first cooler | Blower 9 - Bypass 11 - Bed 4 - bed 5 - Cooler 6 - Chiller 7 |
| g) 2nd cooling | Blower 9 - Bypass 11 - Bed 4 - Cooler 6 - Chiller 7 |

After step g) the regeneration of bed 4 is completed and it may be put again on adsorption step a) to receive feed air. It will be understood that during the above steps b), c) and f) of bed 4, the cooling of bed 3 was completed and the heating of bed 5 started. Ice may collect on the fins of the chiller in step b) and melted again and drained off if the refrigerant flow to the chiller is stopped during step c). The water thus recovered may contain some solvent, say 1%. This solvent may be easily stripped with fresh air. The stripper overhead is then added to the mainstream of air. Alternatively the water with 1% solvent may be injected into the mainstream of air, which has around 1000 times larger mass flow.

EXAMPLE 2

There are 7 beds, NB=7. The steps are b=22, c=12, d=48, e=4, f=22, g=12 minutes.

Thus REG=120, SUB=86, CYCLE=602, a=482 minutes. In time average there are 5.6 beds on adsorption and 1.4 beds on regeneration.

It will be clear to those versed in the art, that this process offers more advantages with larger plants with a larger number of beds. In fact in a small plant with a total of 3 adsorbers the economics are only slightly better than the economics of a conventional cycle: the savings of the smaller regeneration system are compensated with the increased cost of larger adsorbers and higher total weight of activated carbon, so that only the energy savings tip the balance in favor of the new process.

The surface of beds is sized in such a way, that the superficial air velocity across the bed is about 55% of the time slightly lower and about 45% of the time slightly higher than in a conventional cycle, which has always the same number of beds on adsorption. The activated carbon may be granular or pelletized, the most frequently applied pellet diameter will be 3–5 mm. Typical superficial velocity of the air passing the bed will be between 0.12 and 0.30 m/sec.

In the conventional process 25–32% of the activated carbon is highly preloaded with solvent during the cooling step so that the actually available carbon layer for adsorption is substantially reduced. Because of the much better regeneration of the activated carbon with the new process, the same adsorption efficiency can be obtained with a 15–25% shallower bed which means lower pressure drops and lower cost of active carbon. Typical thickness of the carbon bed will be between 500 and 1000 mm.

It will be understood that each of the elements described above, or two or more together, may also find a useful application in other types of methods differing from the types described above.

While the invention has been illustrated and described as embodied in an adsorption process for the recovery of solvents, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A thermal swing adsorption process for solvent recovery, comprising the steps of applying at least three adsorbers with fixed beds of activated carbon; and subjecting each of the beds in overlapping cycles periodically to a sequence of at least the following steps:
   a) passing solvent containing air to a bed where the solvent is adsorbed,
   b) heating the bed in a first heating step with a hot gas coming from another bed which is being cooled,
   c) putting the bed on hold or idle while still another bed completes the step g,
   d) further heating the bed in a second heating step by hot gas in an essentially closed loop,
   f) cooling the bed in a first cooling step in which the gas exiting the cooled bed is passed to another bed starting its heating in accordance with step b),
   g) cooling the bed in a second, final cooling step in an essentially closed loop.

2. A process as defined in claim 1; and further comprising carrying out between the steps d) and f) another cooling step e) in which for a short time the cooling of the bed is started in the same closed loop as under step d) but with a heater inactive.

3. A process as defined in claim 1; and further comprising carrying out between the steps d) and f) another cooling step e) in which for a short time the cooling of the bed is started in the same closed loop as under step d but with a heater bypassed.

4. A process as defined in claim 1; and further comprising cooling the gas leaving the heated bed during step b) and passing the gas to a first chiller for a partial removal of water from the gas.

5. A process as defined in claim 1; and further comprising cooling the gas leaving the bed during step d) and passing the gas to a second chiller for a partial removal of the solvent from the gas.

6. A process as defined in claim 1; and further comprising selecting a duration of the steps b)–g) in percents of a total regeneration time at least as follows:

b) 14%, c) 6%, d) 35%, f) 14% and g) 6%.

* * * * *